(12) United States Patent
Sosseh et al.

(10) Patent No.: US 7,589,484 B2
(45) Date of Patent: Sep. 15, 2009

(54) CLOSED LOOP ACCELERATION CONTROL FOR A DATA STORAGE DEVICE MOTOR

(75) Inventors: Raye Abdoulie Sosseh, Oklahoma City, OK (US); James Wilford DuLaney, Edmond, OK (US); Ryan Todd Lyle, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 746 days.

(21) Appl. No.: 10/455,134

(22) Filed: Jun. 5, 2003

(65) Prior Publication Data

US 2004/0012355 A1    Jan. 22, 2004

Related U.S. Application Data

(60) Provisional application No. 60/394,969, filed on Jul. 10, 2002.

(51) Int. Cl.
*H02P 1/00* (2006.01)

(52) U.S. Cl. .................. 318/400.3; 318/440; 318/442; 318/610; 318/621

(58) Field of Classification Search .............. 318/439, 318/610, 437, 430, 431, 400.12, 400.34, 318/400.35, 442, 621
See application file for complete search history.

(56) References Cited

U.S. PATENT DOCUMENTS

| | | | | |
|---|---|---|---|---|
| 5,793,558 A | | 8/1998 | Codilian et al. | |
| 5,841,252 A | * | 11/1998 | Dunfield | 318/254 |
| 5,859,520 A | * | 1/1999 | Bourgeois et al. | 318/805 |
| 5,874,821 A | * | 2/1999 | Monleone | 318/600 |
| 5,990,656 A | * | 11/1999 | Kardash | 318/807 |
| 6,005,742 A | | 12/1999 | Cunningham et al. | |
| 6,078,158 A | * | 6/2000 | Heeren et al. | 318/430 |
| 6,091,222 A | * | 7/2000 | Vertemara et al. | 318/701 |
| 6,122,139 A | | 9/2000 | Sri-Jayantha et al. | |
| 6,153,989 A | * | 11/2000 | Kardash et al. | 318/400.09 |
| 6,169,981 B1 | | 1/2001 | Werbos | |
| 6,178,060 B1 | * | 1/2001 | Liu | 360/78.07 |
| 6,229,274 B1 | * | 5/2001 | Vertemara et al. | 318/430 |
| 6,232,731 B1 | * | 5/2001 | Chapman | 318/801 |
| 2002/0167287 A1 | * | 11/2002 | Heydt et al. | 318/254 |
| 2003/0184249 A1 | * | 10/2003 | Heydt et al. | 318/560 |

* cited by examiner

*Primary Examiner*—Rita Leykin
(74) *Attorney, Agent, or Firm*—Fellers, Snider et al.

(57) ABSTRACT

Method and apparatus for accelerating a multi-phase motor having a rotatable rotor are disclosed. A first commutation state in which the rotor resides is identified, after which a Proportional, Integral and Derivative (PID) control routine is executed for closed loop control of an acceleration of the rotor from a stopped position to an intermediate velocity, after which back electromotive force (Bemf) commutation is used to control the motor. The PID control routine utilizes a loop gain value optimized through voltage feedback indicative of a response of windings of the rotor to an application of a drive current across the windings. Based on the voltage feedback a controller programmed with the PID control routine provides an updated commanded current for each successive commutation state of the motor for use by a motor driver circuitry, which drives the motor through each commutation state until attainment of the intermediate velocity.

21 Claims, 6 Drawing Sheets

There is one commutation per drive cycle. Position sense measurements repeat until a commutation is detected.

CLOSED LOOP ACCELERATION CONTROL FOR A DATA STORAGE DEVICE MOTOR

RELATED APPLICATIONS

This application claims priority to U.S. Provisional Application No. 60/394,969 filed Jul. 10, 2002, entitled Closed Loop PID (Proportional, Integral and Derivative) Controlled Current for Spindle Motor Startup.

FIELD OF THE INVENTION

This invention relates in general to the field of data storage devices, and more particularly, but not by way of limitation, to closed loop acceleration control of a motor.

BACKGROUND

Electrically commutated, brushless direct current (dc) inductive motors are used in a wide variety of commercial applications. A common application of such a motor is in spindle motor for data storage device. Spindle motors rotate one or more axially aligned data recording discs at a constant high speed. As the discs are rotated, data transducing heads are controllably moved across the disc surfaces to access tracks to which data are stored.

Spindle motors incorporate a stationary stator portion supporting multiple phase windings, electrically connected in a star or delta configuration. A rotatable rotor supports a corresponding array of permanent magnets adjacent the windings.

The rotor is rotated by sequentially, electrically commutating the phase windings. During each commutation period, a drive current is input to one phase, output from another phase, and the remaining phase(s) are held at high impedance.

Market pressures continue to push for electronic devices with improved response times and reliability. As such, challenges remain and a need persists for improvements in the area of motor control, to which the present invention is directed.

SUMMARY OF THE INVENTION

In accordance with preferred embodiments, a method and a combination are provided for closed loop acceleration control of a motor, based on a position of its rotor within an electrical revolution and an application of a real time adjusted motor drive current to windings of the motor.

The combination includes a multi-phase motor driven by a motor driver circuitry controlled by a controller programmed with a position sense routine and a motor drive current adjustment routine.

The method includes determining a location of the rotor of the multi-phase motor by executing the position sense routine programmed into the controller, and applying the real time adjusted motor drive current across selected windings of the multi-phase motor. The location of the rotor is based on values obtained by applying a measurement current windings, selected at a level below a saturation and applied across a pair of windings of the multi-phase motor for a predetermined period of time. The real time adjusted motor drive current is based on a comparison between a predetermined reference voltage and a voltage across a pair of selected windings responding to a previously applied motor drive current.

These and various other features and advantages that characterize the claimed invention will be apparent upon reading the following detailed description and upon review of the associated drawings.

DETAILED DESCRIPTION

Figure 1:
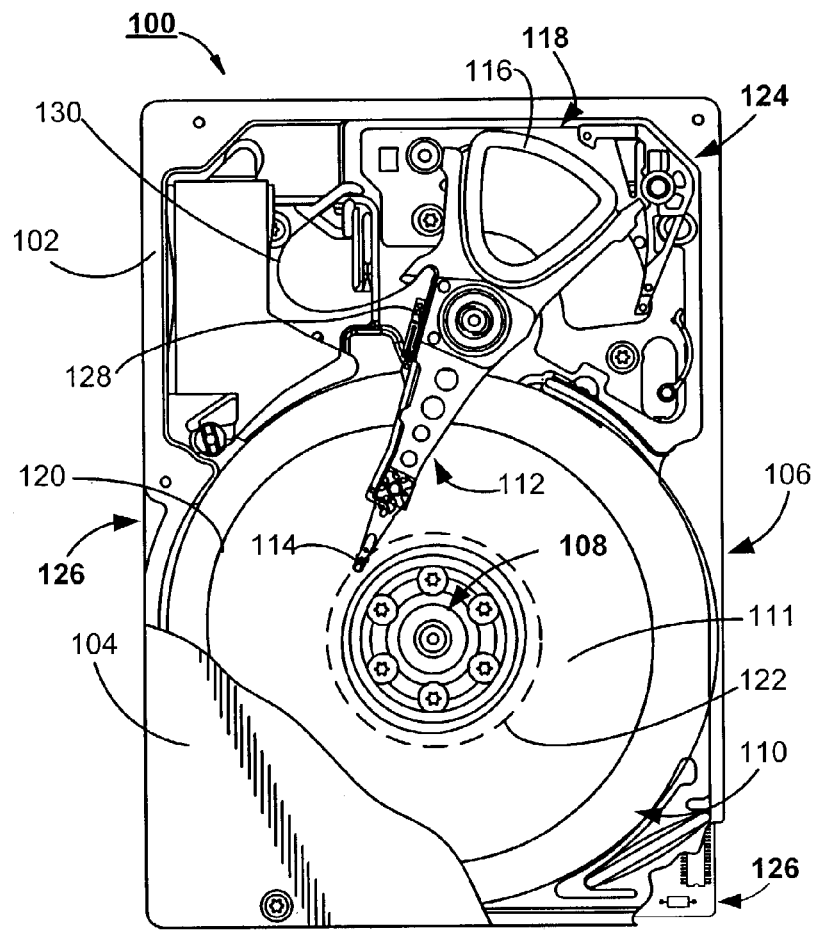
FIG. 1 is a top plan view of a data storage device (DSD) that incorporates a Proportional, Integral, and Derivative (PID) closed loop control routine for controlling DSD motor acceleration.

Referring now to the drawings, FIG. 1 provides a top plan view of a data storage device 100 (also referred to as device 100). The device 100 includes a rigid base deck 102 cooperating with a top cover 104 (shown in partial cutaway) to form a sealed housing for a mechanical portion of the device 100, referred to as a head-disc assembly 106. A spindle motor assembly 108 (also referred to as motor 108) rotates a number of data storage discs 110 with a magnetic recording surface 111 at a substantially constant speed. A rotary actuator 112 (also referred to as actuator 112) supports and rotates a number of read/write heads 114 adjacent the magnetic recording surface 111 when current is applied to a coil 116 of a voice coil motor (VCM) 118.

During operation of the device 100, the actuator 112 moves the heads 114 to data tracks 120 of the magnetic recording surface 111 to write data to and read data from the discs 110. When the device 100 is deactivated, the actuator 112 positions the heads 114 adjacent a home position 122 and the actuator 112 is confined by latching a toggle latch 124.

Command, control and interface electronics for the device 100, are provided on a printed circuit board assembly 126 mounted to the head-disc assembly 106. Operational control of the data storage device is provided by firmware executed by a top level control processor (not separately shown) of the printed circuit board assembly 126. During data transfer operations, a preamplifier/driver (preamp) 128 attached to a flex circuit 130 conditions read/write signals conducted by the flex circuit 130 between the printed circuit board assembly 126 and the read/write head 114.

Figure 2:
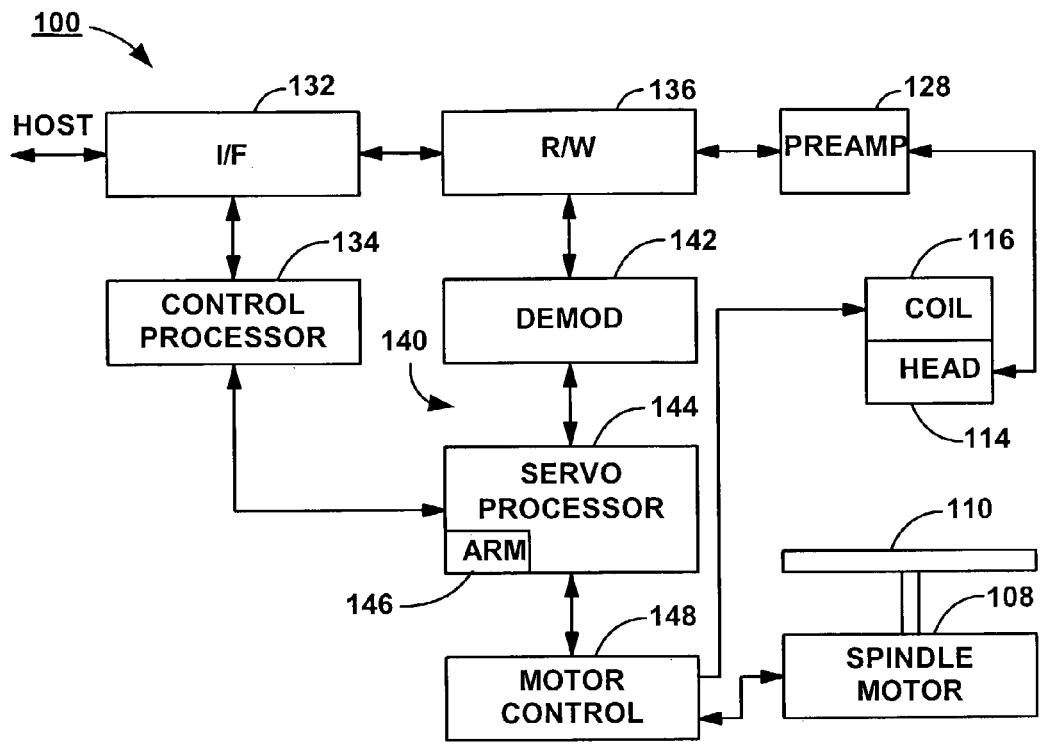
FIG. 2 is a functional block diagram of a circuit for controlling operation of the DSD of FIG. 1 including an Advanced RISC Machine (ARM) with PID control code of the PID control routine programmed into the ARM.

FIG. 2 provides a functional block diagram showing control circuitry provided by the printed circuit board assembly 126 of the device 100 (of FIG. 1).

Data and host commands are provided from a host device to the device 100 using interface (I/F) circuitry 132 in conjunction with a top level control processor 134. Data are transferred between the discs 110 and the host device using the read/write head 114, the (preamp) 128, a read/write (R/W) channel 136 and the I/F circuitry 132.

Head positional control is provided by a closed-loop servo circuit 140 comprising demodulation (demod) circuitry 142, a servo processor 144 (preferably comprising an Advanced RISC Machine, or ARM 146) and motor control circuitry 148. The motor control circuitry 148 applies activation currents to the actuator coil 116 to rotate the actuator 112. The motor control circuitry 148 further applies motor drive currents to the motor 108 to rotate the discs 110.

For purposes of promoting an enhanced understanding of the present invention, and not by way of imparting any limitations on the present invention, a three phase motor model has been selected as a framework for discussion of the present invention throughout the instant disclosure.

Figure 3:
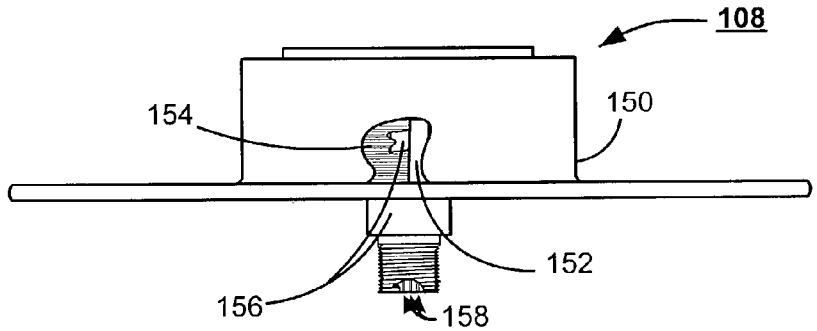
FIG. 3 is a partial cut-away elevational view of the motor of FIG. 1.

The motor 108 shown by FIG. 3 is a preferred embodiment that includes a rotor hub 150 (also referred to as rotor 150) supporting a plurality of permanent magnets (one shown at 152). The permanent magnets 152 are adjacent three motor windings 154 supported by a stator shaft 156. The stator shaft 156 confines motor contacts A, B, and C 158 for locating the rotor and operating the motor 108.

In this preferred embodiment, the determination of which commutation state of an electrical revolution (such as 294 of FIG. 11) the rotor 150 resides, assures proper directional travel of the rotor 150 at spin-up. With location of the rotor 150, the operative pair of windings (AB, BC or CA) is determined, as well as a polarity for the motor drive current to flow across the operative pair of windings to initiate rotation of the rotor 150 in a correct rotational direction.

With knowledge of the operative winding pair and the correct polarity (or direction of current flow) for the motor drive current to flow, a predetermined reference current is applied at an applied voltage (based on a predetermined reference voltage) as the motor drive current across the operative winding pair, for a selected period of time to initiate rotation of the rotor 150. Once rotation of rotor 150 is under way, voltage readings of the response of the operative winding pair to the applied motor drive current are sampled and used to update the applied voltage by comparing the voltage readings with the reference voltage.

Figure 4:
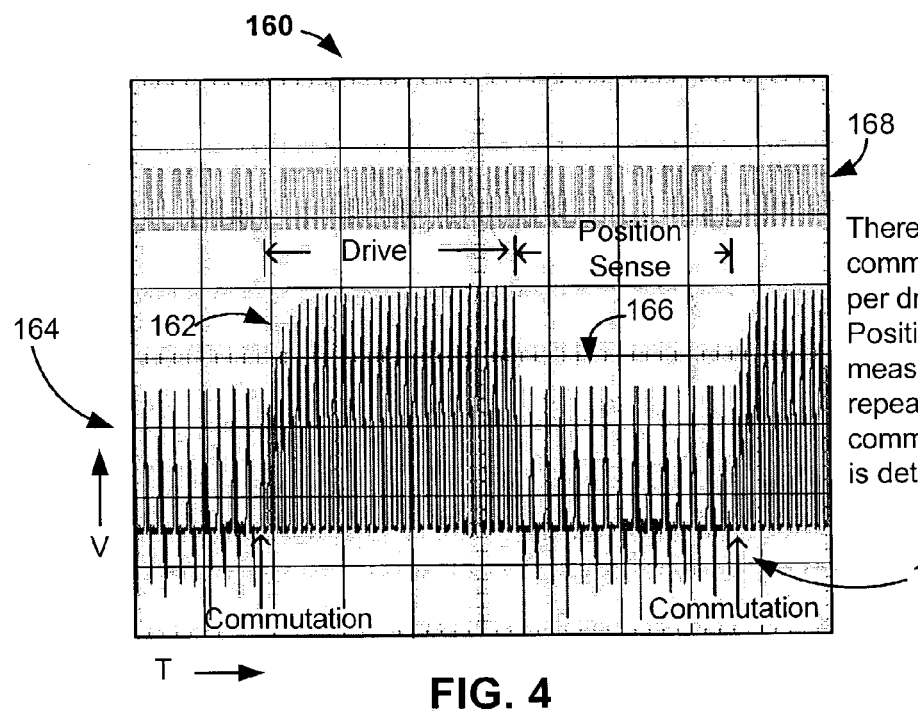
FIG. 4 is a spin-up current voltage plot of a response of a winding pair of the motor of FIG. 3 to an application of a drive current across the winding pair.

As shown by FIG. 4, there are two components to a spin-up current voltage plot 160, a drive portion 162, of a winding pair response voltage (response voltage) 164, and a position sense portion 166, of the winding response voltage 164. The drive portion 162 of the response voltage 164 shows the response of the operative winding pair to an application of a motor drive current portion of a motor current 168 applied across the operative winding pair at the applied voltage over the selected period of time. The position sense portion 166 of the winding response voltage 164 shows a response of the winding pairs to an application of a sense current portion of the motor current 168 applied across the winding pairs during a coast period of time.

The sense current portion of the motor current 168 is at a level sufficient to induce a pulse across each of the winding pairs, but insufficient to cause rotation of the rotor 150. At the conclusion of the selected period of time for application of the motor drive current portion, the sense current portion of the motor current 168 is applied across the winding pairs to sense a first commutation point 170. When the first commutation point 170 is sensed, i.e., the rotor has entered a first commutation state following initial rotation of the rotor 150, the reference current is applied across the winding pair associated with the first commutation state following initial rotation of the rotor 150 at an applied voltage determined through a comparison between the voltage readings with the reference voltage.

During application of the motor drive current portion of the motor current 168 across the operative winding pair used to initiate rotation of the rotor 150, a plurality of sample readings of the drive portion 162 of the winding response voltage 164 are collected and used to update the applied voltage. The updated applied voltage is the voltage level used to deliver the reference current applied across the winding pair associated with the first commutation state following initial rotation of the rotor 150.

This procedure continues, i.e., applying a reference current across successive winding pairs for a selected period of time delivered at an applied voltage; collecting voltage readings while the reference current is being applied; sensing a next commutation point while the rotor 150 is coasting; updating the applied voltage used to apply the reference current across the successive winding pair; and applying the reference current as the drive current portion of the motor current 168 across the successive winding pair until sufficient rotational velocity is achieved to allow self commutation, closed loop control of the rotor 150 by the motor control circuitry 148 (of FIG. 2).

Figure 5:
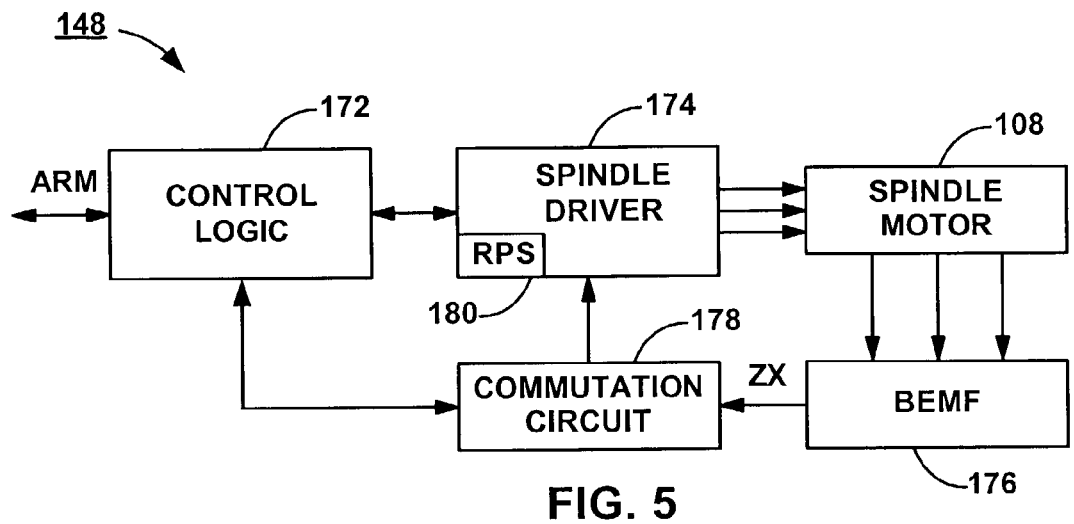
FIG. 5 is a functional block diagram of a motor control circuit controlling a motor of the DSD of FIG. 1.

FIG. 5 provides a functional block diagram of relevant portions of the motor control circuitry 148 (of FIG. 2). Control logic 172 receives commands from and outputs state data to the ARM 146. Spindle driver circuitry (driver) 174 applies drive currents to the phases of the motor 108 over a number of sequential commutation steps to rotate the motor. During each commutation step, current is applied to one phase, sunk from another phase, and a third phase is held at a high impedance in an unenergized state.

Back Electro Motive Force (Bemf) detection circuitry 176 measures the Bemf generated on the unenergized phase, compares this voltage to the voltage at a center tap, and outputs a zero crossing (ZX) signal when the Bemf voltage changes polarity with respect to the voltage at the center tap. A commutation circuit 178 uses the ZX signals to time the application of the next commutation step.

The driver 174 includes rotor position sense (RPS) circuitry 180 to detect electrical position of the motor 108 in a manner to be discussed shortly.

Figure 6:
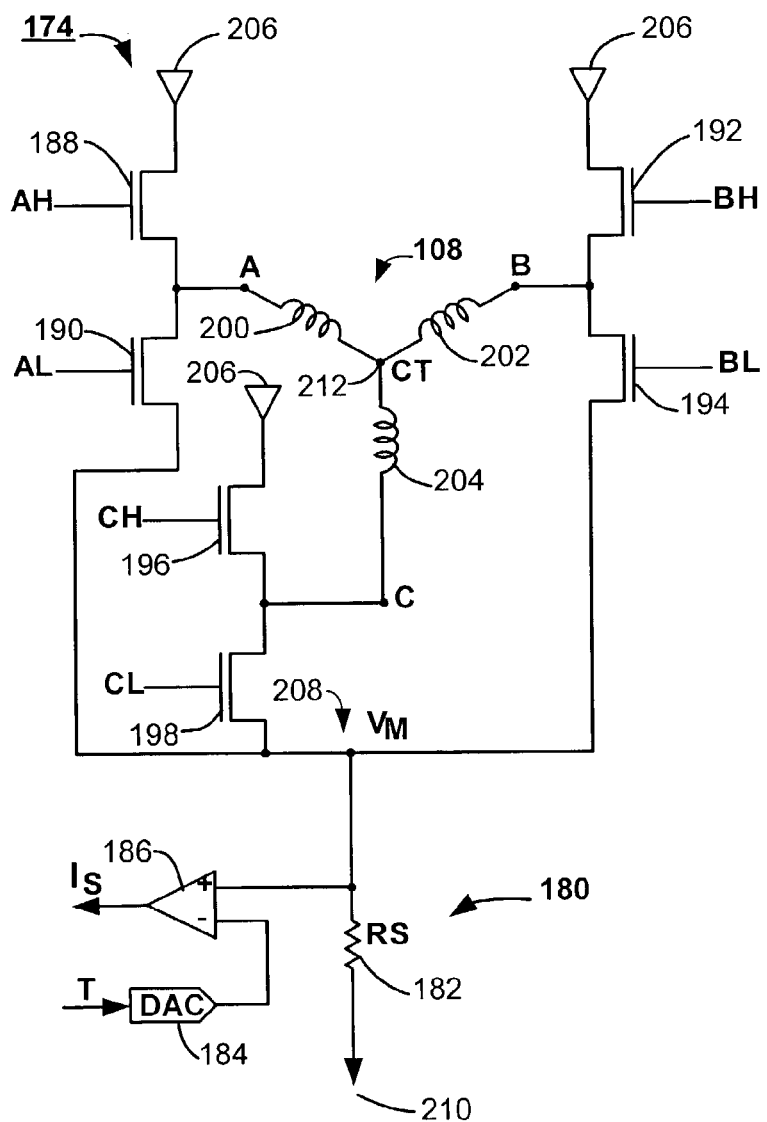
FIG. 6 is a schematic diagram of a motor driver circuitry of the DSD of FIG. 1.

At this point it will be noted, with reference to FIG. 6, that the RPS circuitry 180 includes a sense resistor (RS) 182, a digital to analog converter (DAC) 184 and a comparator 186. FIG. 6 also shows the driver 174 to include six field effect transistors (FETs) 188, 190, 192, 194, 196 and 198, with inputs denoted as AH (A high), AL (A low), BH, BL, CH and CL, respectively. Controlled and timed application of drive currents to the various FETs result in flow of current through current entry points A, B and C phase windings 200, 202 and 204. The drive currents flow from a voltage source 206 to $V_M$ node 208, through the RS 182 to reference node (ground) 210. Motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |

TABLE 1-continued

| Commutation State | Source Phase | Sink Phase | Phase Held at High Impedance |
|---|---|---|---|
| 3 | B | C | A |
| 4 | B | A | C |
| 5 | C | A | B |
| 6 | C | B | A |

During commutation step 1, phase A (winding 200) is supplied with current, phase B (winding 202) outputs (sinks) current, and phase C (winding 204) is held at high impedance. This is accomplished by selectively turning on AH FET 188 and BL FET 194, and turning off AL FET 190, BH FET 192, CH FET 196 and CL FET 198. In this way, current flows from source 206, through AH FET 188, through A phase winding 200, through the center tap (CT node 212), through B phase winding 202, through BL FET 194 to $V_M$ node 208, and through RS 182 to ground 210.

The resulting current flow through the A and B phase windings 200, 202 induce electromagnetic fields which interact with a corresponding array of permanent magnets 152 mounted to the rotor 150 (of FIG. 1), thus inducing a torque upon the rotor 150 in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the motor 108 is determined by the number of poles. With 3 phases, a 12 pole motor will have four electrical revolutions for each mechanical revolution of the motor.

The frequency at which the motor 108 is commutated, referred to as the commutation frequency FCOM, is determined as follows:

$$FCOM=(phases)(poles)(RPM)/60 \quad (1)$$

A three-phase, 12 pole motor operated at 15,000 revolutions per minute would produce a commutation frequency of:

$$FCOM=(3)(12)(15,000)/60=9,000 \quad (2)$$

or 9 kHz. The commutation circuit 178 (of FIG. 5) will thus commutate the driver 174 at nominally this frequency to maintain the motor 108 at the desired operational velocity up to and in excess of 15,000 rpm. The foregoing relations can be used to determine the actual motor speed (and therefore speed error) in relation to the frequency at which the zero crossing ZX pulses are provided from the Bemf detection circuitry 176 (of FIG. 3).

During operation, the motor control circuitry 148 (of FIG. 2) receives input command velocity values and provides a corresponding output range of velocities of the motor 108 from a lower threshold velocity to an upper operational velocity. The threshold velocity is defined as a relatively low velocity of the motor. The operational velocity is the velocity at which the motor is normally operated during data transfer operations.

Velocities above the threshold velocity are high enough to enable the power electronics and speed controllers to regulate the velocity of the motor. Below the threshold velocity, the control circuitry is not effective at regulating the velocity of the motor. More specifically, as a result of limitations in the control electronics, the servo code is limited to the reference current that can be provided. The reference current that can be provided depends on the operating environment of the motor 108, capabilities of a power device used in operating the motor 108 and the load faced by the motor. Therefore, in a preferred embodiment, the reference current is empirically determined and set in the ARM 146 (of FIG. 2) for use during spin-up of the motor 108.

By knowing the reference current applicable for the environment of the motor 108, the resistance, i.e., the maximum resistance the motor will see at start up, and the ability of the power device to provide the needed power (within current limits of the device to avoid over stressing the device) for spin-up, an initial reference voltage value, $V_{ref}$, is set in the controller for motor 108 spin-up. The reference voltage value is used as the initial applied voltage value that the drive current is delivered to the rotor 150. As the motor 108 spins-up the applied voltage value is an updated $V_{ref}$, updated through the use of closed loop PID (Proportional, Integral and Derivative) control routine programmed into the ARM 146, which controls current applied across the operative winding pair, within the current limits of the supply.

Three components: (1) P(E), which is proportional to the error; (2) I/s(E), which is proportional to the integral of the error over time; and (3) Ds(E), which is proportional to the derivative of the error over time, are used to modulate the applied voltage value to a value substantially identical to the reference voltage value, thereby reducing the difference between the applied voltage value and the reference voltage value to zero. The error (E) is the difference between the reference voltage value and the applied voltage value.

The first component P(E), increases the loop gain of the system and thereby reduces its sensitivity to motor 108 parameter variations. The second component I/s(E) increases the order of the system and reduces the steady-state error. The last component Ds(E), stabilizes the system by introducing the derivative term.

In a preferred embodiment, implementing PID control for use during motor 108 spin-up requires feedback of a signal related to the current applied to each operative winding pair during spin-up. The selected signal is the voltage present across the sense resistor 182 (of FIG. 6). The voltage, $V_{sense}$, across the sense resistor 182, $R_{sense}$, is directly related to the current in the motor windings, $I_{sense}$. This relationship is defined by equation 3.0.

It is desired to control the average current used by the motor, so the signal $V_{sense}$ is averaged over 16 samples, reference equation 4.0. This average signal, $V_{avg}$, is subtracted from the reference signal, $V_{ref}$, reference equation 5.0. $V_{ref}$ is related to actual current, $I_{commanded}$, by equation 6.0. This difference signal, Error, is used by the ARM 146 to output a current limit signal, U, that regulates Error to substantially zero, reference equation 5.0.

In an effort to keep the current from exceeding the capabilities of the power devices, a saturation limit function programmed into the ARM 146, is used, which saturates U at an upper or lower current limit value (each of which are empirically determined for the power device of interest). The value returned by this saturation limit function is the signal used to control the spindle motor 108. The complete process is detailed in FIG. 12, "Closed Loop PID Control Process Diagram" to be covered in more detail below.

$$Vsense=Rsense*Isense \quad (3.0)$$

Where, $R_{sense}=0.05$ ohms in a preferred embodiment.

$$V_{avg} = \sum_{i=0}^{N-1} Vsense \quad (4.0)$$

Where, N=16 in a preferred embodiment.

$$Error=V_{ref}-V_{avg} \quad (5.0)$$

$$V_{ref}=I_{commanded}*R_{sense}*BitPerVolt*BitShift \quad (6.0)$$

Where BitPerVolt=1024 and Shift=64 in a preferred embodiment.

$$U = \text{Error} * \left( P + \frac{I}{s} + Ds \right) \quad (5.0)$$

Upon attaining a threshold velocity, the motor control circuit commanded velocity values for velocities below the threshold velocity still results in the reference current value, not a lower current value required for slower motor operation.

These respective velocities can take any number of relative values depending on the particular application, and are by and large related to the specific construction of the motor. For purposes of the present discussion, illustrative values are about 500 to 800 revolutions per minute (rpm) for the threshold velocity and about 15,000 rpm for the operational velocity.

Figures 7, 8:
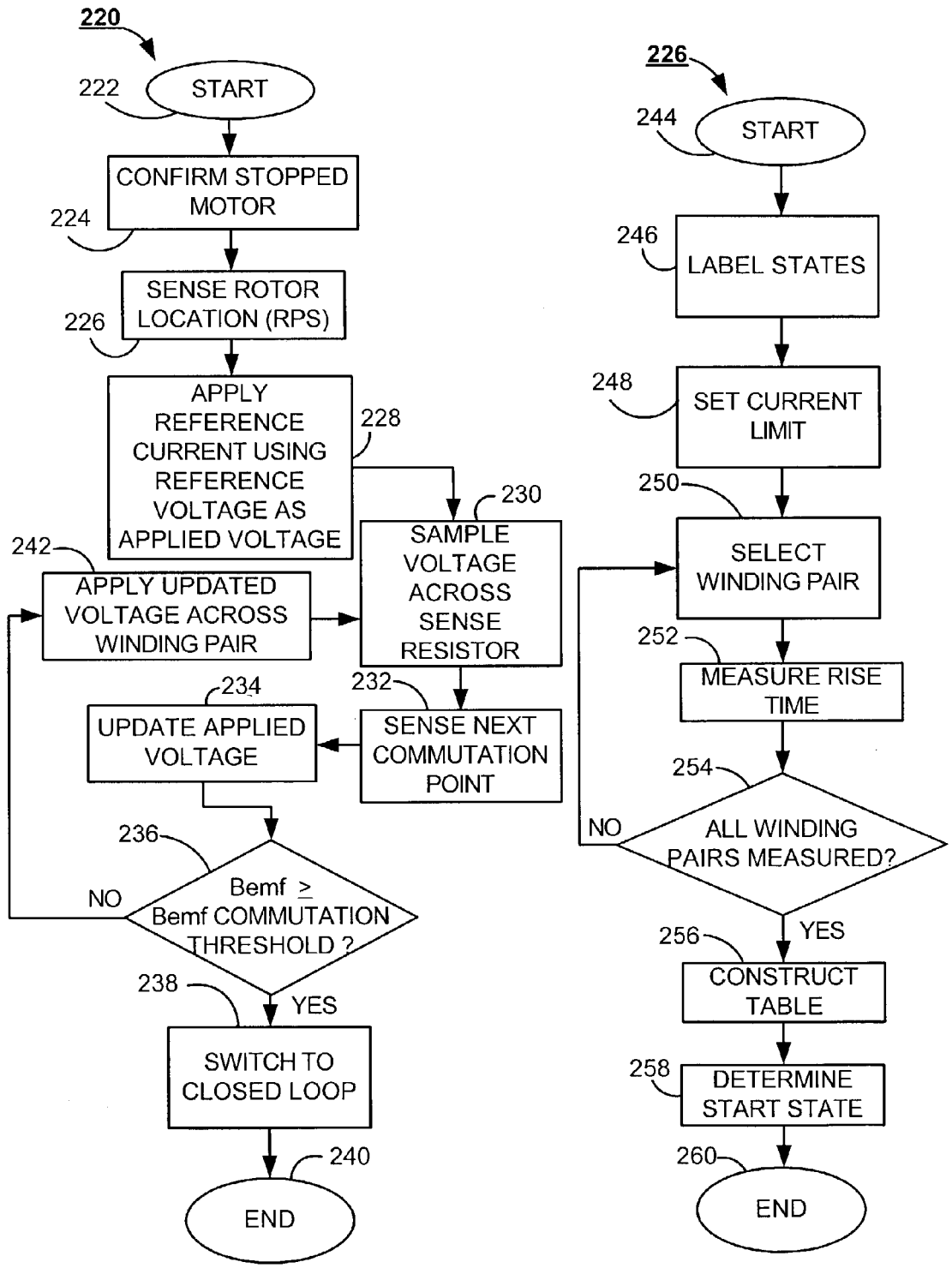
FIG. 7 is a flow chart of the PID control code of FIG. 2.
FIG. 8 is a flow chart of a method for determining a start state of a rotor of the motor of FIG. 3.

The PID control code flow chart of FIG. 7 shows a motor start process sequence 220 to start and accelerate a motor (such as 108). The motor start process sequence 220 commences at start process step 222 and continues at process step 224 by confirming the motor is stopped. At process step 226, the location of a rotor (such as 150) of the motor is sensed through use of a "Rotor Position Sense Routine" (RPS). Execution of RPS, commences upon confirmation that the motor is stopped, and a spin-up command is received by a servo processor (such as 144) from a control processor (such as 134).

Covered in greater detail during the discussion of FIG. 8, RPS determines in which commutation state the rotor resides while the motor is in the stopped position. For three-phase motors, there are six commutation states within each electrical revolution. Each state spans 60 (360/6) electrical degrees. Advancement of the rotor through a commutation state constitutes a commutation cycle. Advancement through all six commutation states constitutes an electrical revolution.

After determining in which commutation state the rotor resides, the motor start process sequence 220 continues at process step 228 with an application for a selected time (either read from a table or determined on the fly) of a reference current at an applied voltage level. From the stopped position, an empirically determined reference voltage value is loaded into an applied voltage value register of a controller (such as ARM 146). The applied voltage value is used in setting the applied voltage level for application of the reference current, or commanded current, to the rotor. As addressed hereinabove, the empirically determined reference voltage depends on the abilities of the power source and the characteristics of the motor under load.

At process step 230, a voltage response of the rotor to the applied commanded current is sampled across a sense resistor (such as 182) over the duration of the applied reference current. In a preferred embodiment, sixteen sample voltage readings are collected and stored for use in adjusting the value stored in the applied voltage value register. At the conclusion of the application of the reference current to the rotor, the rotor enters a coast mode and winding pairs (such as AB, BC and CA) are used to sense the next commutation state at process step 232.

At process step 234, the value of the applied voltage value of the register is updated and serves as the reference voltage ($V_{ref}$) for the next subsequent application of drive current to the operative winding pair. As described during the discussion of FIG. 6, in a preferred embodiment, the sixteen sample voltage samples stored during process step 230 are averaged and the resultant average is subtracted from the $V_{ref}$, i.e., the applied voltage of the preceding application of drive current to the operative winding pair, to provide an error voltage signal used by the controller to output a current limit signal, U. U is saturated at either an upper or lower current limit determined by a saturation limit function (an empirically derived function), programmed into the controller, to provide the applied voltage value signal used to control the spindle motor 108.

In other words, through use of the PID control loop, as the motor 108 spins-up, the voltage level applied across each successive operative winding pair decreases at a decreasing rate from operative winding pair to operative winding pair, as the rotor 150 accelerates in response to the applied commanded current.

Employing PID control, the processor works in tandem with a motor driver circuitry (such as 174) to accelerate the motor from a stopped position to a predetermined rotational velocity. In a preferred embodiment, when the rotational velocity of the motor reaches a certain rpm (revolution per minute) range (for example, about 500-800 rpm), sufficient Bemf (Back Electro Motive Force) is generated to allow the motor driver circuitry to commutate without the help from the processor. Commutation without the aid of the processor is referred to as; "closed loop" operation of the motor.

At process step 236, a determination of whether sufficient Bemf has been generated to meet a predetermined Bemf commutation threshold is made. The Bemf commutation threshold is determined during the design phase of the data storage device. If sufficient Bemf has been generated, the process advances to process step 238 and rotational control of the motor is switched to the closed loop operating mode. Upon attainment of closed loop operation, the process concludes at end process step 240. However, if sufficient Bemf has not been generated, the process proceeds to process step 242.

At process step 242, the updated applied voltage value is applied across the operative winding pair and the process cycles through, and continues to cycle through process steps 230, 232, 234, 236 and 242 until the rotational velocity attained is sufficient to generate sufficient Bemf to support the closed loop operating mode of the motor driver circuitry, without the aid of the execution of the PID control loop routine by the controller.

Upon achieving sufficient Bemf, the process progresses to process step 238, which switches control of the motor to the closed loop operating mode, and the process concludes at end process step 240.

FIG. 8 provides a flow chart for a rotor sense position routine 226 (such as called for by step 226 of FIG. 7), illustrative of steps carried out by the data storage device 100 in accordance with preferred embodiments of the present invention to determine in which commutation state the rotor 150 resides, in preparation for accelerating the motor from a stopped position.

Rotor sense position routine 226 commences with start step 244 and continues with step 246 by labeling the commutation states corresponding to an electrical revolution. Labeling of the commutation states is preferably achieved through operation of on board firmware executed by the top level control processor 134.

At step 248, measurement current limits are selected. An upper limit for the measurement current is selected at a level slightly below a saturation level. The electrical pulse develops as a result of passing the measurement current through a selected pair of windings. During rise time (RT) measurements of the electrical pulse, a timer of the top level processor is used to monitor progress of the RT measurements. A predetermined time limit for the pulse to develop is set and monitored by the timer. A lower limit for control of the measurement current is set sufficient to achieve development of the electrical pulse within the predetermined time limit.

At step 250, a first labeled commutation state (such as C+A−) is selected and the measurement current is applied across a pair of windings (such as 204 and 200) associated with the selected commutation state. The measurement current is injected into the first of the pair of selected windings at a current entry point (such as C) of the first of the pair of selected windings.

The measurement current progresses through the pair of windings, and exits the windings at a current entry point (such as A) of the second winding of the pair of windings. Passage of the measurement current through the windings develops the electrical pulse. An RT of the electrical pulse is measured at step 252 and the RT measurement data are stored. Results of the measurement data are used to provide a raw RT plot.

Decision step 254 determines whether all winding pairs have been measured. If not, the routine returns to step 250 where the next pair of windings is selected. Once measurements have been obtained for all winding pairs, the flow continues from step 254 to step 256 where a table is constructed that identifies rotor position as a function of inductive rise times (such as exemplified by Table 2 discussed below). The routine then determines a start state (i.e., the commutation state with which the rotor 150 is initially aligned) at step 258 through reference to the table, and the process ends at step 260.

Returning to FIG. 6, in a preferred embodiment, an inductive RT is a function of the inductance and resistance between the two active phase windings, indicative of a response of two of the three phase windings 200, 202 and 204, of the motor 108, to an injection of electrical current for a predetermined time across a selected pair of the three phase windings. RT is defined as a time taken for a pulse to develop following injection of electrical current through selected windings [the direction of the input current is important because the rise-time may have a different quantitative measure, if the direction of the input current is reversed].

Because the function of the rotor 150 (of FIG. 3) affects the total effective inductance, RT is also a function of the position of the rotor 150 relative to the phase windings 200, 202 and 204, and is useful in determining both location and position of the rotor 150, i.e., determining in which one of the 60 electrical degree commutation states the rotor is located.

Figure 9:
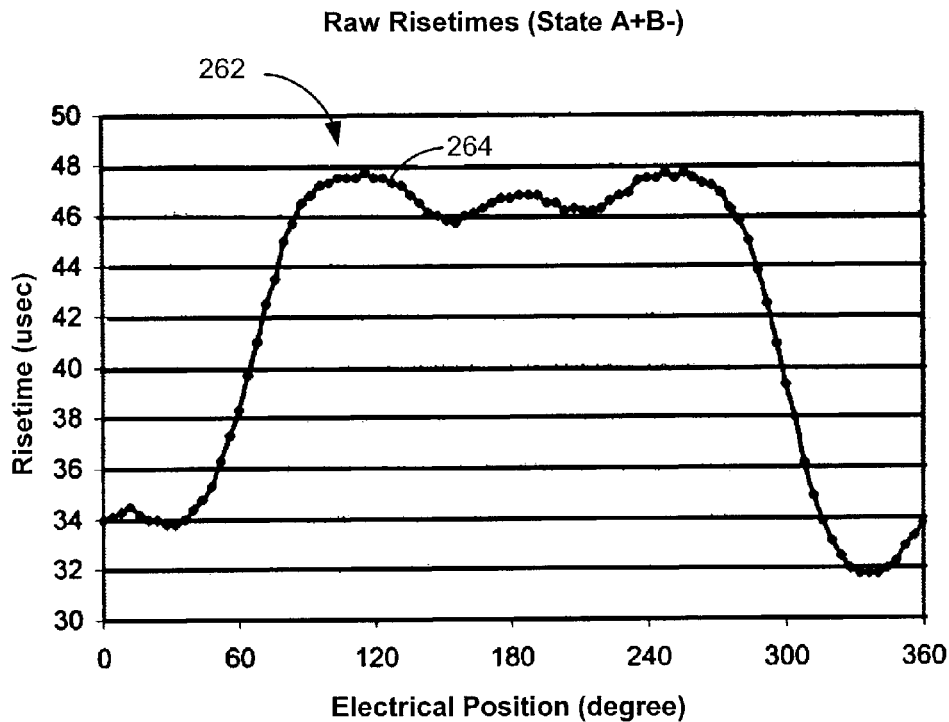
FIG. 9 is diagram of an inductive rise time plot characterizing a response by pair of windings' of the motor of FIG. 3 responding to an applied current.

FIG. 9 shows a plot 262 of a raw RT curve 264 reflective of an indicative response of a selected pair of the three phase windings (such as 200, 202 and 204 of FIG. 6), to an application of a measurement current across two current entry points of the selected pair of windings (such as A, B and C of the phase windings 200, 202 and 204 (of FIG. 6).

For purposes of enhancing an understanding of the present invention, and absent an imposition of limitations on the present invention, the raw RT measurement plot of FIG. 9 may be viewed as a rise time of a pulse resulting from a measurement current flowing through phase windings 200 and 202 for a predetermined period of time.

Referring back to FIG. 6, entry of the measurement current is at current entry point A of phase winding 200 and moves toward current entry point B of phase winding 202. The measurement current is controlled at a level slightly lower than a saturation current level, but at a level sufficient to develop the pulse within the predetermined period of time. Movement of the measurement current from entry point A, through phase windings 200 and 202 to entry point B defines movement of the measurement current through commutation state (A+B−). Saturation current is a level of current needed to rotate the rotor 150 relative to the stator shaft 156 of the motor 108 (of FIG. 3).

RT of a single commutation state is insufficient to describe the location of the rotor 150 within the electrical revolution, i.e., in which commutation state the rotor 150 resides. In a preferred embodiment, six commutation states (A+B− and A−B+, B+C− and B−C+, C+A− and C−A+) of a three phase motor are used to determine in which commutation state of the electrical revolution the rotor 150 resides.

Figure 10:
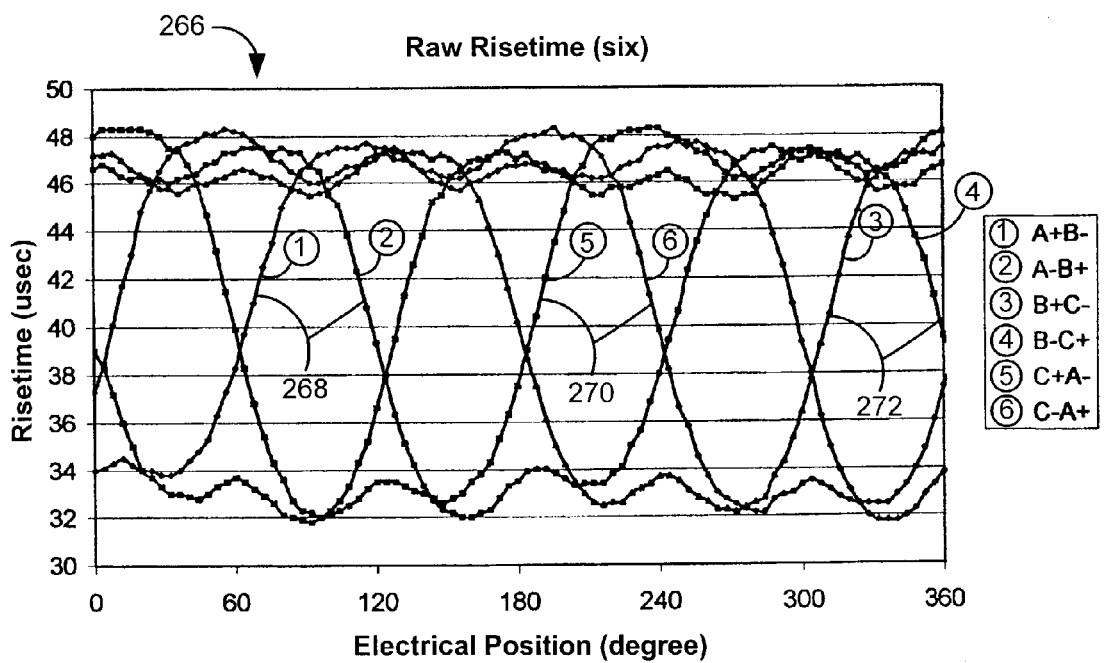
FIG. 10 is diagram of inductive rise time plots characterizing a response by each pair of windings' of the motor of FIG. 3 responding to an applied current.

FIG. 10 shows a composite plot 266 of all six raw RTs of a 3-phase motor. The six raw RTs, or three pairs of raw RT plots, are shown as: A+B−(1) and A−B+(2) (pair 1, 268); B+C−(3) and B−C+(4) (pair 2, 270); and C+A−(5) and C−A+ (6) (pair 3, 272).

The direction of the injected measurement current is important because of its affect on the total effective inductance across the windings. For example, the RT plot A+B−(1) shows the result of injecting the measurement current at current entry point A, of phase winding 200, and exiting through current entry point B, of phase winding 202. Whereas the RT plot A−B+(2) shows the result of injecting the measurement current at current entry point B, of phase winding 202, and exiting through current entry point A, of phase winding 200.

Figure 11:
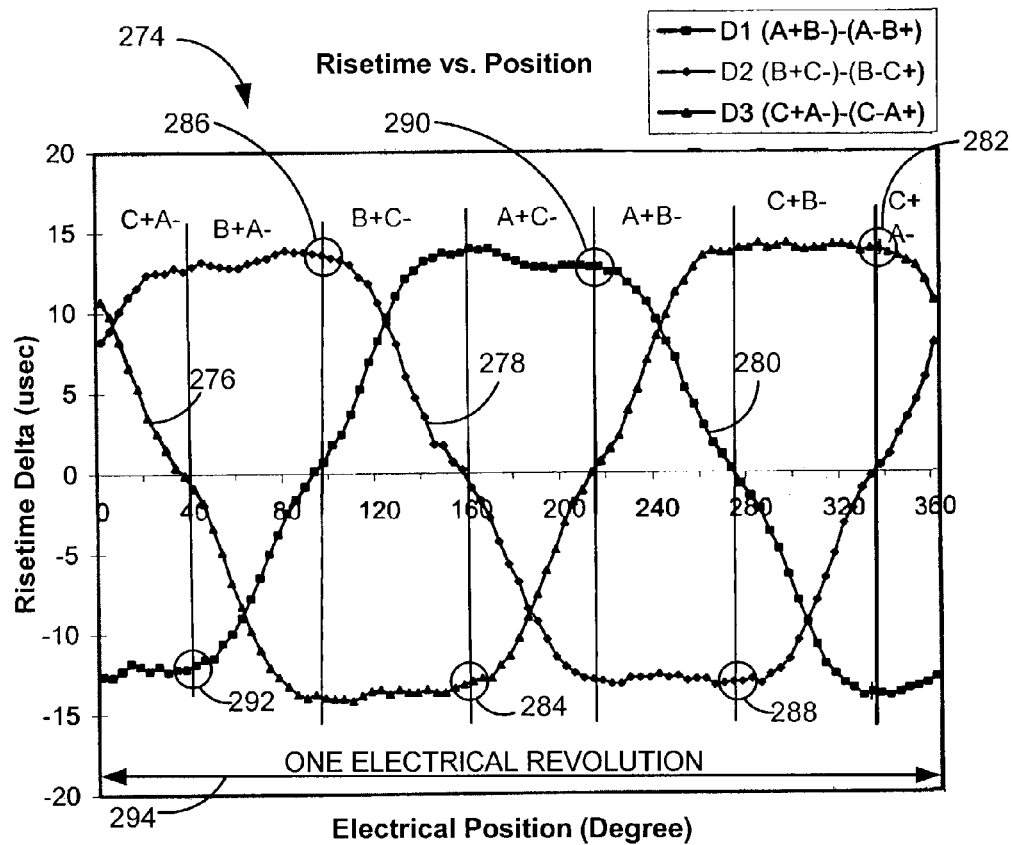
FIG. 11 is a diagram characterizing a difference between inductive rise times for each winding pair of the motor of FIG. 3 responding to applied current at different polarity.

For a three phase motor embodiment, when all six RTs are obtained, from which three RT delta curve plots are computed. Each RT delta curve plot results from a combination of two opposite pair of raw RT plots (plots of a common pair of windings reflective of currents of opposite polarity flowing through the winding pair), such as a resultant plot formed from a difference between pair 1, 268, i.e., the difference between RT (A+B−) and RT (A−B+). FIG. 11 shows a Rise Time Deltas vs. Rotor's Position plot 274 for each of the RT pairs 268, 270 and 272.

$$D1=[\text{inductive rise time}(A+B-)]-[\text{inductive rise time} (A-B+)] \quad (3)$$

$$D2=[\text{inductive rise time}(B+C-)]-[\text{inductive rise time} (B-C+)] \quad (4)$$

$$D3=[\text{inductive rise time}(C+A-)]-[\text{inductive rise time} (C-A+)] \quad (5)$$

By viewing FIG. 11, it can be readily seen that each zero crossing point of each of the RT delta curves 276, 278 and 280 defines a boundary of a commutation state and thereby a commutation point. A trailing edge of a first commutation state coexists with a leading edge the next commutation state. By determining which RT delta curve incurred a zero crossing, i.e. a change in sign, at the trailing edge of a commutation state, the windings involved with the progression of the rotor through that the commutation state are confirmed. By analyzing the slope of the RT delta curve of the involved windings, the direction of the current flow through the involved windings is known.

Knowledge of which commutation state a stopped rotor resides provides knowledge of which commutation state will be next encountered, i.e., which pair of windings will next be involved with the advancement of the rotor. The direction of current flow through the pair of windings for the commutation state of the stopped rotor 150 provides knowledge for initiating rotation of the rotor as well as the appropriate direction of current flow through the next pair of windings involved in the rotation of the rotor 150.

The RT delta curves D3 (276), D2 (278), and D1 (280) are used to form a "Rotor Position as A Function of Inductive Rise Times" (Table 2), which is useful in determining which commutation state the rotor 150 is initially located. Table 2, Rotor Position as A Function of Inductive Rise Times, describes how a commutation state is chosen based on the Delta plots 274 and the correspondent parameter used to calculate the rotor position.

The loop gain value of block 302, the reference voltage 305 and the limiter function of block 306 are each empirically determined based on an appropriate current level, i.e., a reference current available for initiating rotation of the rotor 150 (of FIG. 3) from a stopped position. The reference current that

TABLE 2

| D1 = (A+B-) - (A-B+) | D2 = (B+C-) - (B-C+) | D3 = (C+A-) - (C-A+) | Commutation State | Parameter Used To Determine The Rotor's Position |
|---|---|---|---|---|
| - | [+] | [+] | C+A- | D3 (282 FIG. 9) |
| [-] | + | [-] | B+A- | -D1 (292 FIG. 9) |
| [+] | [+] | - | B+C- | D2 (286 FIG. 9) |
| + | [-] | [-] | A+C- | -D3 (284 FIG. 9) |
| [+] | - | [+] | A+B- | D1 (290 FIG. 9) |
| [-] | [-] | + | C+B- | -D2 (288 FIG. 9) |

Table 2 shows that, for commutation state (C+A-), RT delta curve D3 switches signs at the boundary of commutation states (C+A-) and (B+A-). This defines windings 204 and 200 (of FIG. 6) as the operative windings for commutation state (C+A-). Because D3 has a positive value across the commutation state, the parameter used to determine the position of the rotor is the value associated with the positive D3 at the commutation point of the operative commutation state, i.e., 282 of FIG. 11.

As can readily be seen, Table 2 is useful in determining in which state the rotor 150 resides. If the rotor resides in commutation state C+A-, D1 will be negative, D2 will be positive and D3 will be positive. If the rotor resides in commutation state B+A-, D1 will be negative, D2 will be positive and D3 will be negative, and so on.

Table 2 is also useful during acceleration of the rotor 150. To accelerate the rotor 150, a drive current (the reference current in a preferred embodiment) is applied for a period of time across the pair of windings appropriate for advancement of the rotor 150 from a stopped position. Following the application of the drive current the rotor 150 coasts to the next commutation point. During this period of coasting, RT measurements are made and used for determination of the rotor position. Based on a change in sign of the delta curve of the operative winding, Table 2 is queried to determine the operative winding pair and direction the $I_{commended}$ will flow to be applied to the operative winding pair for acceleration of the rotor 150.

Figure 12:
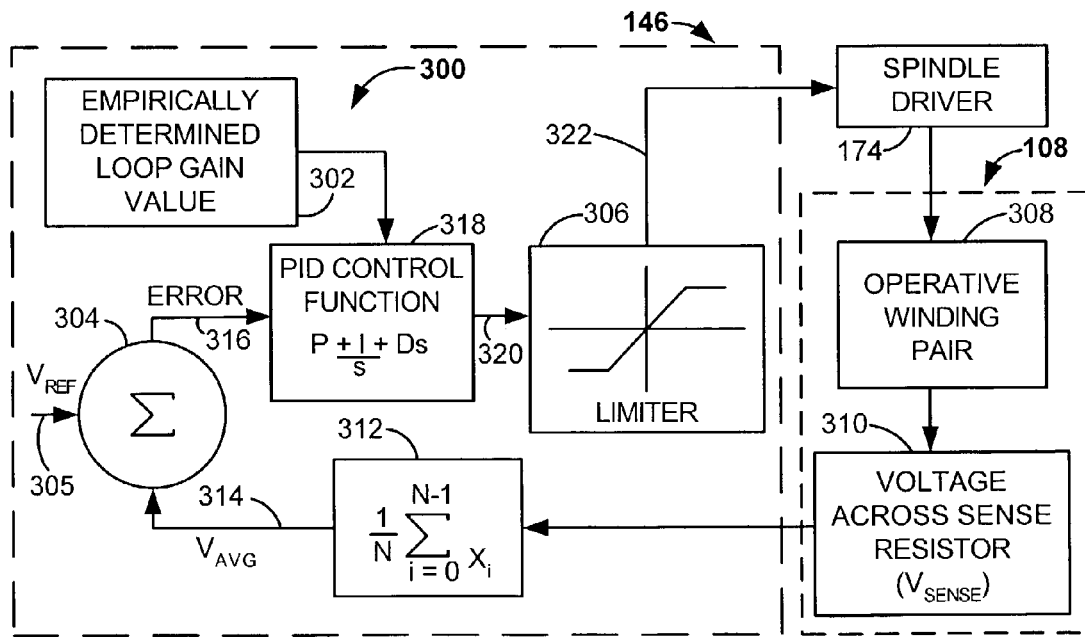
FIG. 12 is a functional block diagram of the PID control routine programmed into the ARM of FIG. 2.

FIG. 12 shows the functional relationship between the ARM 146 (also shown in FIG. 2), programmed with a PID control routine 300, a spindle driver 174 (also shown in FIG. 5) and the motor 108 (also shown by FIG. 3). The PID control routine 300 includes and empirically determined loop gained value (block 302), a voltage summing function (shown by block 304), a reference voltage (shown at 305), an empirically determined saturation current limit function ([limiter function] shown by block 306), an operative winding pair of the motor 108 (shown by blocking 308), a voltage measurement function (shown at block 310), a voltage smoothing function (shown by block 312), which outputs an average voltage 314 (an average of the voltage measurements made by block 310), an error signal 316 (determined by a comparison of the average voltage 314 and the reference voltage 305), and a PID control function (shown by block 318).

can be provided depends on the operating environment of the motor 108, capabilities of a power device used in operating the motor 108 and the load faced by the motor. Therefore, in a preferred embodiment, the reference current is empirically determined and set in the ARM 146 (of FIG. 2) for use during spin-up of the motor 108.

Characteristics of the power device, the motor windings 154 and the permanent magnets 152 (of FIG. 3), interplay in determining a saturation current for the motor 108 and a rise time of the saturation current. The capabilities of the power device, i.e., the maximum power output that the power device can operate without overstressing the device is used in establishing an upper saturation current value for the limiter function shown by block 306. While the rise time of the saturation current is used in determining a rate of change for the current limiter function, and the saturation current (a minimum current that which rotation of the rotor commences) is used in setting a lower saturation current value for the limiter function shown by block 306.

A total motor load of the motor 108 starting from a stopped position is determined during the design phase of the data storage device 100 (of FIG. 1) and used as the resistance encountered by a drive current applied across an operative winding pair of the motor windings 154. Knowing the reference current, and the resistance encountered during application of the reference current to be operative winding pair, the reference voltage ($V_{REF}$) 304 is readily determined.

With the limiter function defined and the $V_{REF}$ 304 determined, boundary constraints for determination of the loop gained value used by the PID control routine 300 are established to proceed with resolution of loop gain value.

With the empirically determined loop gained value stored in a first register of the ARM 146, the limiter function loaded into the PID control routine 300, the PID control routine 300 programmed into the ARM 146, and $V_{REF}$ 304 stored in a second register of the ARM 146, acceleration of the rotor 150 is poised to commence upon receipt of a start command from the control processor 134 (of FIG. 2).

Upon receipt of the start command from the control processor 134, the ARM 146 executes the PID control routine 300 by providing the PID control function of block 318 with the empirically determined loop gained value of block 302. The PID control function of block 318 outputs a current limit signal, (U) 320, that regulates Error 316 to zero (reference equation 5.0). Because drive current has not been passed through the determined operative winding pair, a voltage measurement across the sense resistor 182 (of FIG. 6) is unavailable for processing by the voltage smoothing function of block 312, which is unable to output the average voltage ($V_{AVG}$) 314 for combination with the $V_{REF}$ 304. As such, the $V_{REF}$ 304 is passed to the PID control function of block 318, which outputs U 320 with a very large error.

U 320, is passed to the limiter function of block 306, which outputs a current limit function signal 322 that commands the spindle driver 174 to apply the upper saturation current as the drive current across the predetermined operative winding pair of the windings 154 (the operative winding pair is determined through execution of the Rotor Position Sense Routine 226 by the ARM 146, before execution of the PID control routine 300).

This spindle driver 174 applies the drive current across the operative winding pair and voltage measurements of the response of the operative winding pair to the application of the drive current at block 310. In a preferred embodiment, the voltage measurements are taken across the sense resistor 182 and preferably, 16 voltage samples are taken over the period of time the drive current is applied across the predetermined winding pair (it is noted that the number of samples is user-defined, and may range from one to as many samples as may be gathered over the period of time that the drive current is applied across the predetermined winding pair). Each of the voltage measurements made at block 310 are passed to the voltage smoothing function of block 312.

The voltage smoothing function of block 312 provides the output $V_{AVG}$ 314 that is substantially an average of the voltage measurements received from block 310. $V_{AVG}$ 314 is combined with the $V_{REF}$ 305 by the voltage summing function of block 304 to provide the error signal 316. The PID control routine 300 passes the error signal 316 to the PID control function of block 318 and execution of the PID control routine 300 continues to cycle until sufficient Bemf is provided by the rotating rotor 150 to enable self commutation by the spindle driver 174 for control of the motor 108.

Figure 13:
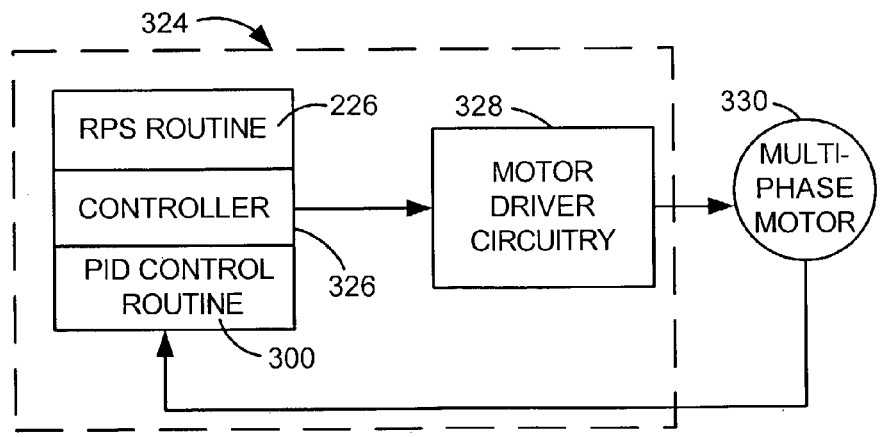
FIG. 13 is a functional block diagram of an acceleration control system controlling a multi-phase motor.

While preferred embodiments discussed above have in the main been directed to the acceleration of a motor in the environment of a data storage device, it will be readily understood that such is not limiting to the scope of the claimed invention. FIG. 13 shows a generalized functional block diagram of a preferred embodiment of an acceleration control system 324, incorporating a controller 326 controlling a motor driver circuitry 328 for use in controlling an acceleration of a multi-phase motor 330. The acceleration control system 324 can be utilized in any number of applications (commercial, industrial, oil field, etc.), in which a multi-phase motor is rotated.

The controller 326 executes a rotor position sense routine (such as 226), programmed into the controller 326, to determine a first commutation state of an electrical revolution (such as 294) in which a rotor of the multi-phase motor 330 resides. The position of the rotor within the electrical revolution is based on values obtained through application of a measurement current applied across a pair of windings of the multi-phase motor 330. The measurement current is selected at a level below a saturation current level for the multi-phase motor 330.

Based on rotor position, and static characteristics of the multi-phase motor 330, the controller 326 further executes a PID control routine (such as 300), programmed into the controller 326. The controller 326 working in tandem with the motor driver circuitry 328, executes the PID control routine to control acceleration of the rotor of the multi-phase motor 330 to a predetermined velocity. The predetermined is based on a level of rotational velocity sufficient to produce sufficient Bemf for the motor driver circuitry 328 to operate independent from the controller 326. The motor driver circuitry 328 continues acceleration of the multi-phase motor 330 to an operating velocity, at which time the motor driver circuitry 328 continues operational control over the multi-phase motor 330.

Across each commutation state of the electrical revolution the rotor travels, the controller 326 provides a current limit function signal 322 (of FIG. 12), i.e., a commanded current signal, which commands the motor driver circuitry 328 to apply a drive current (determined by the PID control routine 300) across an operative winding pair of the multi-phase motor 330. The result of the application of the drive current across the operative winding pair is an occurrence of an acceleration time period during which the rotor accelerates through the commutation state, while the drive current is being applied, followed by a coast time period that the rotor coasts through the same commutation state to the nest subsequent commutation state.

While the rotor is coasting, the rotor position sense routine 226 is executed by the controller 326 to determine the transition of the rotor to the next subsequent commutation state of the electrical revolution. While the drive current is applied to the operative winding pair, the controller 326 executes the PID control routine 300 to measure an actual voltage response of the operative winding pair to the application of the drive current.

The voltage measurement is compared to a predetermined reference voltage to provide an error value to a PID control function of the PID control routine 300. The PID control function adjusts a predetermined loop gain value (empirically determined for the motor 330 of interest), used to determine a specific current limit signal indicative of a commanded current provided by the controller 326 to the motor driver circuitry 328 for driving each subsequent operative winding pair.

In other words through use of the PID control routine 300, as the multi-phase motor 330 spins-up, the voltage level applied across each successive operative winding pair decreases to achieve the desired commanded current. Not only does the voltage level applied across each successive operative winding pair decrease, but the rate at which the change in voltage applied across each successive operative winding pair decreases, from operative winding pair to operative winding pair, as the rotor accelerates in response to the applied commanded current.

Accordingly, embodiments of the present invention are substantially directed to a method (such as 220) and apparatus (such as 324) for accelerating a rotor (such as 150). A location within an electrical revolution (such as 294) of a stopped rotor of a multi-phase motor (such as 108) is determined by activating a rotor position sense routine (such as 226) programmed into a controller (such as 326).

Executing a proportional, integral, and derivative (PID) closed loop control routine (such as 300) programmed into the controller, the controller directs an acceleration of the rotor from a stopped position to an intermediate velocity, after which back electromotive force (Bemf) commutation is used to accelerate the motor to the final operational velocity.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

For example, the present invention may be applied to non data storage devices environments, such as for motors utilized in down-hole applications, sump pump applications, conveyor system or for any application utilizing multi-phase motors.

What is claimed is:

1. A method comprising:
applying a drive pulse across a winding of a motor at a reference current level and at a first voltage level while measuring a voltage drop across the winding;
sensing a next commutation state transition of the motor; and
applying a second drive pulse across a subsequent winding of the motor at the reference current level and at a different second voltage level selected in relation to the measured voltage drop.

2. The method of claim 1 wherein the sensing step comprises sequentially applying sense pulses to a plurality of windings of the motor and measuring a corresponding rise time for a resulting voltage related to the electrical rotational position of the rotor.

3. The method of claim 2, in which the sense pulses comprise current pulses selected to be at a level insufficient to induce rotation of the rotor.

4. The method of claim 1, in which the applied voltage level is an empirically determined reference voltage.

5. The method of claim 1 further comprising:
determining whether a back electro motive force (Bemf) commutation threshold has been attained; and
applying the reference current across the subsequent winding associated with the respective commutation state furthering rotation of the rotor when the Bemf commutation threshold has been unattained.

6. The method of claim 5 further comprising:
sampling a subsequent voltage response of the subsequent winding to the reference current applied across the subsequent winding associated with the respective commutation state, the reference current applied at the updated applied voltage level;
sensing a subsequent commutation state based on a subsequent electrical pulse applied across the subsequent winding associated with the respective commutation state during the furtherance of rotation of the rotor;
updating the applied voltage level based on the subsequent sampled voltage;
determining whether the Bemf commutation threshold has been attained; and
applying the reference current across a subsequent winding associated with the subsequent commutation state furthering rotation of the rotor, when the Bemf commutation threshold has been unattained.

7. The method of claim 6 further comprising:
repeating the sampling, sensing, updating, determining and applying steps until attainment of the Bemf commutation threshold; and
using the Bemf commutation to accelerate the motor to the final operational velocity.

8. The method of claim 6, in which the applying step comprises:
determining whether a back electro motive force (Bemf) commutation threshold has been attained; and
applying the reference current across the respective winding associated with the subsequent commutation state furthering rotation of the rotor, when the Bemf commutation threshold has been unattained; else
using the Bemf coin-mutation to accelerate the motor to the final operational velocity when the Bemf coin-mutation threshold has been attained.

9. The method of claim 1, in which the applying step comprises:
determining whether a back electro motive force (Bemf) commutation threshold has been attained; and
applying the reference current across the subsequent winding associated with the respective commutation state furthering rotation of the rotor when the Bemf commutation threshold has been unattained; else
using the Bemf commutation to accelerate the motor to the final operational velocity when the Bemf commutation threshold has been attained.

10. Circuitry that is configured to apply a reference current across a selected winding of a motor at an applied voltage level and to apply the reference current across a subsequent winding of the motor at a different updated applied voltage level to accelerate the motor.

11. The apparatus of claim 10, in which the circuitry applies a measurement current for a predetermined time across each of the windings of the motor, wherein the measurement current generates a pulse characterized by an inductive rise time when applied across each winding, and wherein the measurement current is at a current level which precludes rotation of the motor.

12. The apparatus of claim 10, wherein the circuitry is characterized as a programmable processor with associated programming stored in a memory device and comprising:
a rotor position sense (RPS) routine which determines a first winding pair associated with the first commutation state of the motor; and
a proportional integral and derivative (PID) control routine which determines the reference current for rotation of the motor to a subsequent commutation state.

13. The apparatus of claim 12, in which the first commutation state is a first commutation state of a plurality of commutation states of an electrical revolution, and in which the selected winding is a first winding of a plurality of windings, and wherein each of the plurality of windings is associated with a specific commutation state of the electrical revolution.

14. The apparatus of claim 13, in which the PID control routine determines a specific reference current for each of the plurality of windings.

15. The apparatus of claim 14, in which application of the reference current across the winding generates an acceleration time period in which the motor accelerates through the commutation state of the electrical revolution associated with the winding, along with a coast time period in which the motor coasts through the same commutation state of the electrical revolution, the coast time period subsequent to the acceleration time period.

16. The apparatus of claim 15, in which the RPS routine determines a transition of the motor to a subsequent commutation state during the coast time period, and wherein the PID control routine measures a voltage response of the winding to the applied reference current during the acceleration period.

17. The apparatus of claim 12, in which the PID control routine comprises:
a predetermined loop gain value stored in a register;
a PID control function responsive to the loop gain value determining a current limit signal based on the loop gain value;
a predetermined saturation current limit function responsive to the PID control function determining the reference current;

a voltage measurement function responsive to the reference current applied across the selected winding measuring a voltage response of the winding to the applied reference current;

a voltage smoothing function responsive to the voltage measurement function providing an average voltage of the voltage response; and a voltage summing function responsive to the voltage smoothing function combining the average voltage with a predetermined reference voltage, the voltage summing function determining an error signal that the PID control function combines with the predetermined loop gain value to determine an updated reference current for rotation of the rotor to a subsequent commutation state.

18. The apparatus of claim 11, further comprising back electromotive force (Bemf) detection circuitry and wherein the circuitry accelerates the motor to the intermediate velocity at which the motor generates sufficient Bemf to allow the Bemf detection circuitry to detect motor velocity, after which the circuitry applies drive pulses to the motor to accelerate the motor from the intermediate velocity to the final operational velocity in relation to the detected Bemf.

19. A method comprising:
identifying a first commutation state in which a rotatable rotor of a multi-phase motor resides;
applying a reference current at an applied voltage level across a winding of the motor to initiate a rotation of the rotor;
sampling a voltage response of the winding to the reference current applied across the winding at the applied voltage level;
sensing a subsequent commutation state;
updating the applied voltage level based on the sampled voltage; and
applying the reference current at the updated applied voltage level across a subsequent winding of the motor associated with the respective commutation state furthering rotation of the rotor.

20. The method of claim 19, in which the applying step comprises:
determining whether a back electro motive force (Bemf) commutation threshold has been attained; and
applying the reference current across the respective winding associated with the subsequent commutation state furthering rotation of the rotor when the Bemf commutation threshold has been unattained; else
using the Bemf commutation to accelerate the motor to the final operational velocity when the Bemf commutation threshold has been attained.

21. Circuitry that is configured to apply a measurement current for a predetermined time across each winding of a motor, wherein the measurement current generates a pulse characterized by an inductive rise time when applied across each winding, and wherein the measurement current is at a current level which precludes rotation of the motor, and wherein the circuitry is further configured to apply a reference current across a selected winding of the motor at a first voltage source level and to apply the reference current across a subsequent winding of the motor at a different second voltage source level to accelerate the motor.

* * * * *

UNITED STATES PATENT AND TRADEMARK OFFICE
CERTIFICATE OF CORRECTION

PATENT NO. : 7,589,484 B2  Page 1 of 1
APPLICATION NO. : 10/455134
DATED : September 15, 2009
INVENTOR(S) : Raye Abdoulie Sosseh et al.

It is certified that error appears in the above-identified patent and that said Letters Patent is hereby corrected as shown below:

In Col. 16, line 1
replace "Bemf coin-mutation"
with "Bemf commutation."

In Col. 16, line 2
replace "Bemf coin-mutation"
with "Bemf commutation."

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO.      : 7,589,484 B2                                       Page 1 of 1
APPLICATION NO. : 10/455134
DATED           : September 15, 2009
INVENTOR(S)     : Sosseh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Twenty-first Day of September, 2010

David J. Kappos
*Director of the United States Patent and Trademark Office*